(12) United States Patent
Schlarb

(10) Patent No.: US 7,966,082 B2
(45) Date of Patent: Jun. 21, 2011

(54) METHOD FOR OPERATING A CALCULATING UNIT AND SIGNAL FOR PROCESSING IN A CALCULATING UNIT

(75) Inventor: Eberhard Schlarb, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 683 days.

(21) Appl. No.: 11/629,572

(22) PCT Filed: Jun. 15, 2005

(86) PCT No.: PCT/EP2005/052763
§ 371 (c)(1), (2), (4) Date: Dec. 14, 2006

(87) PCT Pub. No.: WO2005/124478
PCT Pub. Date: Dec. 29, 2005

(65) Prior Publication Data
US 2009/0118847 A1    May 7, 2009

(30) Foreign Application Priority Data
Jun. 18, 2004 (EP) .................................. 04014407

(51) Int. Cl.
G05B 9/02 (2006.01)
(52) U.S. Cl. .......................................... 700/81; 700/78

(58) Field of Classification Search ................ 700/18, 700/31, 32; 706/20, 47
See application file for complete search history.

(56) References Cited

U.S. PATENT DOCUMENTS

| | | | |
|---|---|---|---|
| 4,355,358 A | 10/1982 | Clelford et al. | |
| 4,641,517 A | 2/1987 | Spock et al. | |
| 4,974,180 A | * 11/1990 | Patton et al. | 700/292 |
| 5,168,441 A | * 12/1992 | Onarheim et al. | 700/17 |
| 5,838,563 A | * 11/1998 | Dove et al. | 700/83 |
| 6,173,208 B1 | * 1/2001 | Park et al. | 700/83 |
| 6,571,133 B1 | * 5/2003 | Mandl et al. | 700/18 |
| 2003/0220703 A1 | * 11/2003 | Humpert et al. | 700/18 |

OTHER PUBLICATIONS

P. Wetterlind and W. M. Lively, "Ensuring Software Safety in Robot Control", Exploring Technology—Today and Tomorrow, Dallas, TX, Oct. 25-29, 1987, Proceedings of the Fall Joint Computer Conference, Washington, IEEE Computer Soc. Press, US., pp. 34-37, XP000012656, Abstract.

* cited by examiner

*Primary Examiner* — Kidest Bahta
*Assistant Examiner* — Carlos Ortiz Rodriguez

(57) ABSTRACT

The invention relates to a method for operating a calculating unit, whereon at least one part of the signals and a marking relating to the quality of the signals and an attribute relating to a current transmission frequency of the marking are attributed. The inventive signal also comprises a marking relating to the quality of the signals thereof, and an attribute relating to a current transmission frequency of the marking.

5 Claims, 1 Drawing Sheet

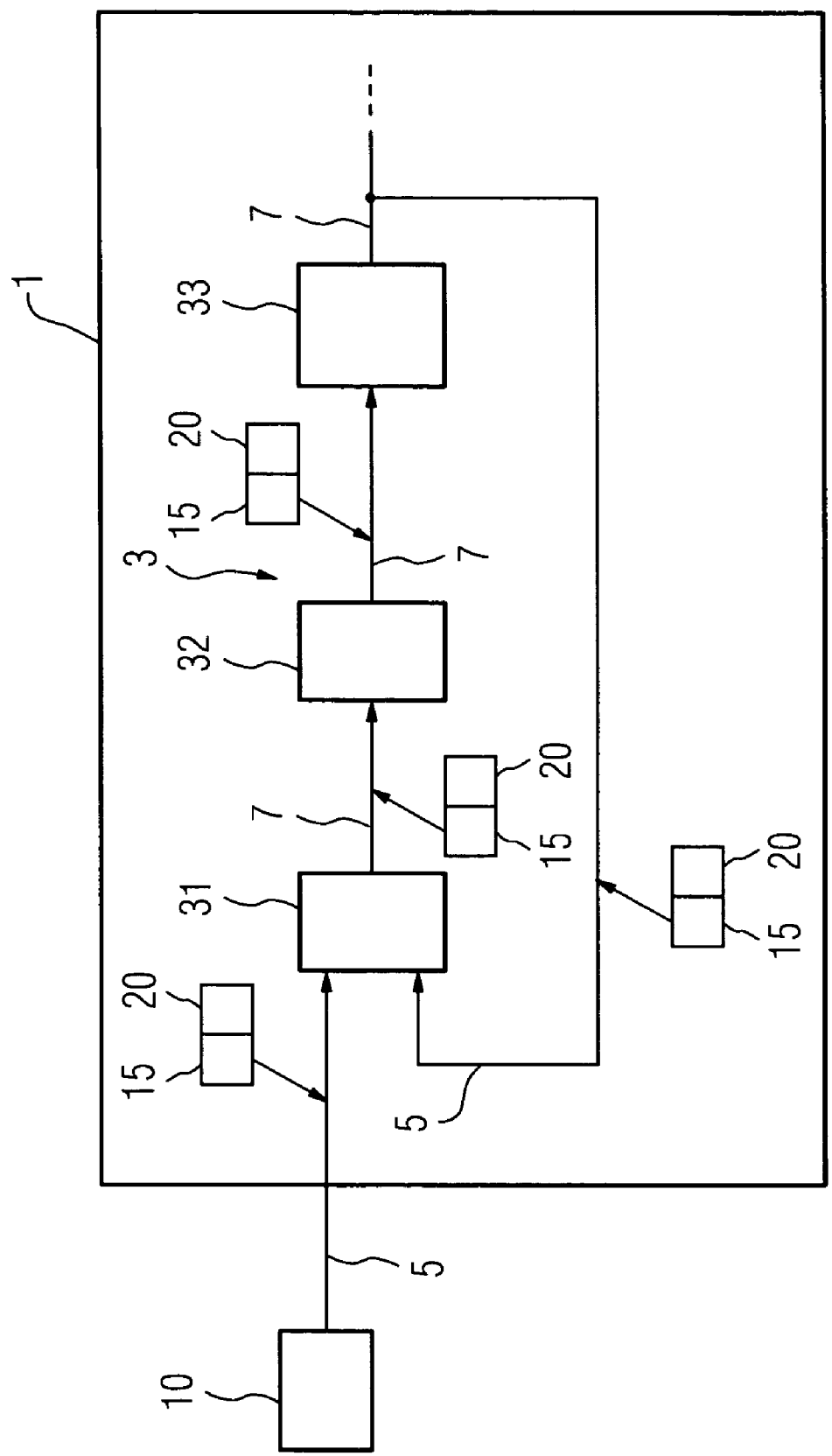

METHOD FOR OPERATING A CALCULATING UNIT AND SIGNAL FOR PROCESSING IN A CALCULATING UNIT

CROSS REFERENCE TO RELATED APPLICATIONS

This application is the US National Stage of International Application No. PCT/EP2005/052763, filed Jun. 15, 2005 and claims the benefit thereof. The International Application claims the benefits of European Patent application No. 04014407.3 filed Jun. 18, 2004. All of the applications are incorporated by reference herein in their entirety.

FIELD OF INVENTION

The invention relates to a method for operating a calculating unit and to a signal for processing in a calculating unit.

This involves the calculating unit executing a software program which processes input signals and generates output signals from them. The software program in this case can also involve interoperating software modules within a more complex software program, with the software modules processing input signals in each case and generating output signals—which may possibly then be used as input signals of downstream software modules.

BACKGROUND OF THE INVENTION

In the area of automation technology what are known as Programmable Logic Controllers or a PC-technology-based emulation of said controllers are used to execute control programs for a technical installation. These control programs generally comprise a number of software modules, for example for implementing specific control tasks using a closed-loop controller, with the software modules in their turn mostly being subdivided into further software modules such as organizational components, function components, data components or step components for example.

The term "software program" used in this document is thus intended to include both a complete software program as a whole and also individual software modules of a more complex software program as well as further software modules, possibly as part of a software module (such as the previously-mentioned components for example).

Thus input signals in the sense of the present invention are both those signals occurring as a result of direct measurements by means of sensors and to be transmitted to the software program and also those signals which are generated by a software program in the above sense as output signals and are transferred to a downstream software program for further processing as its input signal or input signals.

A signal source can thus be both a sensor which detects original signals occurring, but also an intermediate result of signal processing, which is determined for example by a software program and/or software module and/or further software module, and transmitted to a further software program and/or software module and/or further software module.

When signals occur in a signal source the generated signal can be incorrect, bad (noisy) or sometimes not available, as a result of a signal source fault for example. For example, as a result of a wire break at a sensor, the signal detected by the sensor cannot be forwarded or can only be forwarded intermittently, or a division by zero is performed in a calculation algorithm in signal processing in a software program and/or software module and/or further software module.

To enable these types of disturbed signals to be recognized, the process of providing a marking (a so-called quality code for example) along with the signal to indicate the quality of the signal is known. A quality code of "bad" would then mean that on further processing of such a signal by software programs located downstream in the signal direction it is possible to take into account these types of errors by enabling a warning message to be generated for example which points to the bad signal or even by suppressing further processing.

It is further known that the marking of a bad signal is dominantly inherited, meaning that those software programs which process a bad signal also mark their relevant output signals as bad.

If these types of bad signal are now fed back in a type of feedback loop as input signals to software programs and/or software modules and/or further software modules, as a result of the dominantly inherited marking "bad", each of the output signals which is included in the feedback loop remains in the "bad" state although the faults in the signal source can have been rectified in the meantime.

SUMMARY OF INVENTION

The underlying object of the invention is thus to specify an improved method of operating a calculating unit and also an improved signal for processing in a calculating unit by means of which the particular disadvantages mentioned above can be overcome.

As regards the method the object is achieved in accordance with the invention by a method for operating a calculating unit by means of which a software program is executed,
  with the software program including the processing of input signals and the generation of output signals,
  with at least a part of the output signals being fed back and thereby being used as at least one input signal for the software program,
  with at least a further part of said signals having a marking which is correlated with the quality of the corresponding signals,
  with the marking being passed on during the further processing of the corresponding signals to at least one of the output signals generated during further processing and with at least the further part of the signals featuring at least one attribute in each case which is correlated with a current inheritance frequency of the marking.

The invention is based here are on the idea that for a known method for operating a calculating unit in which the passing on of a marking to a subsequent signal occurs, in cases in which the marking is dominantly inherited—that is retained in the further processing—signals incorrectly marked as a "bad" are further processed although the original cause which has produced the "bad" marking is now no longer present.

This problem occurs especially in so-called feedback loops in which output signals and/or intermediate signals are fed back to the inputs of software programs and/or software modules located further forwards in the signal direction.

For example a signal source or a processing function can create a signal marked as "bad" (for example caused by a break in a wire at a sensor or if a mathematical division by zero is performed in an algorithm). The marking "bad" is inserted into the signal in such cases. if such a signal is now further processed by software programs and/or software modules which dominantly inherit this marking, and if at least one processing result determined in such cases is used again as an input variable for an upstream software program and/or software module, then a feedback loop is formed in which this dominantly inherited attribute of "bad" is retained in an undesirable manner.

In the inventive method the attribute is thus provided which gives an indication of how frequently the marking has already been further inherited in the signal processing.

Advantageously a current value of the attribute is compared with a predetermined frequency limit value.

For example it is possible to define in the form of a frequency limit value of 5 that a marking of "bad" can be at most passed on again five times and will then be reset to the value "good". This enables the so-called inheritance depth of dominantly inherited markings to be limited, which leads to the automatic removal of a "bad" marking from a feedback loop. This means that such a marking disappears automatically after a defined number of processing cycles.

In very many cases which occur in practice it is true to say that an incorrect signal is not present permanently but is correct once more after a specific number of processing cycles, if for example an algorithm no longer leads to any further division by zero or the wire break in a sensor has been rectified in some way.

Each software program and/or software module which further processes a dominant marking of a signal increments the value of the attribute by one for example. If a number of signals are then processed by a software program and/or software module which each have a dominantly inherited marking, then for the formation of the marking of a processing result of this software program and/or software module, the input signal which is relevant is the signal for which the marking has the smaller inheritance depth.

If the inheritance depth of the dominantly inherited marking now reaches the frequency limit value in the signal processing, instead of the dominant marking "bad" the non-dominant marking "good" is set by the software program and/or software module currently performing the processing.

This suppresses the generally undesired further inheritance of dominant signal markings in signal feedback loops automatically after a definable number of processing cycles.

In an especially preferred embodiment of the invention a modification of a current value of the marking is thus triggered by the frequency limit value being exceeded.

The invention furthermore leads to a signal with a marking which can be inherited during its processing in a calculating unit which is correlated with the quality of the signal, with an attribute which is correlated with a current inheritance frequency of the marking being included in the signal.

BRIEF DESCRIPTION OF THE DRAWING

An exemplary embodiment of the invention is explained in more detail below. The sole FIGURE shows:

a signal processing feedback loop to illustrate the inventive method.

DETAILED DESCRIPTION OF INVENTION

The FIGURE shows a calculating unit 1 which processes a software program 3. The software program 3 in this case comprises interconnected software modules 31, 32, 33.

A signal source 10, for example a sensor device, creates an input signal 5 which is processed by software module 31 into an output signal 7. This output signal 7 is forwarded for further processing to a software module 32 connected downstream in the signal processing direction, which in its turn creates a further output signal 7 and transmits this as an input signal to software module 33.

The output signal 7 of the software module 33 is fed back to the software module 31 and further processed there as an input signal 5. In the present exemplary embodiment there is thus a data processing feedback loop to software module 31.

In accordance with the invention the signals 5, 7 have a marking 15 and also an attribute 20.

The marking 15 is in this case a measure for the quality of the signal and specifies for example whether the signal is reliable or originates from a disturbed signal source.

The attribute 20 is correlated with a current inheritance frequency of the marking and its current value specifies how often, as a result of any further processing which may have taken place, the marking 15 has already been inherited.

An inheritance is said to be dominant if the marking 15 cannot be changed during further processing by a software module 31, 32, 33 connected downstream in the signal flow direction. For example an input signal 5 marked as "bad" which originates from a harmful signal source 10, cannot suddenly become "good" simply by further processing of this signal, since the relevant result of the further processing of this signal must be based on the bad signal and the result of the further processing is thus also "bad".

In the case discussed below it is assumed that the signal source 10 is disturbed and is thus delivering a bad input signal 5. This signal is thus given a marking 15 to identify it as "bad" and the corresponding attribute 20, which is assigned to the signal of the signal source 10, is given the value zero.

The bad input signal 5 is now further processed in software module 31 into output signal 7, with this output signal also being marked as "bad" but its corresponding attribute 20 however being given a value of one.

Said output signal 7 is further processed below by software module 32, which in its turn creates an output signal which is given a marking of "bad" and has a current value for the attribute 20 equal to two.

Finally the value of the marking 15 of the processing result of the software module 33 remains "bad" and the attribute 20 is set to three.

Let is now be assumed that at this point in time at the latest, or even earlier, the signal source 10 is no longer disturbed and thus the input signal 5, which is fed from the signal source 10 to the first software module 31, is reliable.

If a frequency limit of three has been defined, in the further processing of the signal 15 fed back from software module 33 to software module 31, the marking of said signal can be reset to "good", so that all further processing results subsequently occurring will likewise be marked as "good".

This prevents a marking of "bad" still being fed into the endless loop despite the original cause of the problem no longer being present.

The invention claimed is:

1. A method for operating a calculating unit that executes a software program, comprising:
    inputting a plurality of input signals, to the software program;
    processing the plurality of input signals, by the software program;
    generating a plurality of output signals by the software program;
    feeding-back at least one of the plurality of output signals of the software program to the input of the software program;
    marking a portion of each input signal that is inputted and processed by the software program, wherein the marking is correlated with the quality of the corresponding input signals to indicate a dominant or non-dominant marking, wherein the dominant marking is passed on in further processing of the corresponding signals to at least one of the output signals generated in the further processing;

correlating an attribute of the further processed signals with a current inheritance frequency of the dominant marking;

correlating an attribute of each of the plurality of input signals with the inheritance frequency of one of the plurality of input signals having a smallest inheritance frequency;

comparing a current value of the attribute with a predetermined inheritance frequency limit value that identifies a frequency that the marking may be inputted and processed by the software program; and re-setting the dominant marking to a non-dominant marking if the inheritance frequency limit value is exceeded.

2. The method as claimed in claim 1, wherein a marking able to be passed on in a calculating unit during processing is correlated with the quality of the inputted signals such that the marking is either a dominant or a non-dominant marking, characterized in that the inputted signals also feature an attribute, which is correlated with a current inheritance frequency of the dominant marking.

3. The method as claimed in claim 1, wherein the calculating unit is a Programmable Logic Controller.

4. The method as claimed in claim 1, wherein the calculating unit is a PC-technology-based emulation of a Programmable Logic Controller.

5. The method as claimed in claim 1, wherein a marking able to be passed on in a calculating unit during processing is correlated with the quality of the further processed signal such that the marking is either a dominant or a non-dominant marking, characterized in that the further processed signal also features an attribute, which is correlated with a current inheritance frequency of the dominant marking.

* * * * *